United States Patent
Dahlen et al.

(10) Patent No.: US 9,383,939 B2
(45) Date of Patent: Jul. 5, 2016

(54) MIGRATING AND RETRIEVING QUEUED DATA IN BYTE-ADDRESSABLE STORAGE

(71) Applicant: International Business Machines Corporation, Armonk, NY (US)

(72) Inventors: Dennis J. Dahlen, Rhinebeck, NY (US); David A. Elko, Austin, TX (US); David H. Surman, Milton, NY (US); Peter G. Sutton, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 13/832,189

(22) Filed: Mar. 15, 2013

(65) Prior Publication Data

US 2014/0281342 A1    Sep. 18, 2014

(51) Int. Cl.
G06F 12/00 (2006.01)
G06F 3/06 (2006.01)
G06F 12/02 (2006.01)

(52) U.S. Cl.
CPC .............. *G06F 3/0647* (2013.01); *G06F 3/067* (2013.01); *G06F 3/068* (2013.01); *G06F 3/0613* (2013.01); *G06F 3/0619* (2013.01); *G06F 12/023* (2013.01)

(58) Field of Classification Search
CPC ......... G06F 3/0647; G06F 3/067; G06F 9/50; G06F 9/5016; G06F 9/5038; G06F 9/5088; G06F 3/1224; G06F 9/4856
See application file for complete search history.

(56) References Cited

U.S. PATENT DOCUMENTS

| | | | |
|---|---|---|---|
| 5,822,562 A * | 10/1998 | Dahlen et al. | 711/170 |
| 5,875,484 A | 2/1999 | Neuhard et al. | |
| 6,665,814 B2 | 12/2003 | Hobson et al. | |
| 6,789,143 B2 * | 9/2004 | Craddock | G06F 9/546 710/52 |
| 7,013,305 B2 | 3/2006 | Elko et al. | |
| 7,251,815 B2 | 7/2007 | Donovan et al. | |
| 7,543,303 B2 | 6/2009 | Le et al. | |
| 7,603,649 B2 | 10/2009 | Poindexter et al. | |
| 8,661,216 B2 * | 2/2014 | Kavuri | G06F 3/061 711/165 |
| 2011/0010514 A1 * | 1/2011 | Benhase et al. | 711/162 |
| 2011/0078700 A1 | 3/2011 | Blackburn et al. | |
| 2011/0161976 A1 | 6/2011 | Alexander et al. | |
| 2011/0276729 A1 * | 11/2011 | Allen et al. | 710/39 |

\* cited by examiner

*Primary Examiner* — Kevin Verbrugge
*Assistant Examiner* — Tahilba Puche
(74) *Attorney, Agent, or Firm* — Cantor Colburn LLP; William A. Kinnaman, Jr.

(57) ABSTRACT

In an exemplary embodiment of this disclosure, a computer-implemented method may include storing in a primary storage a plurality of list entries belonging to an ordered list. Free space in the primary storage may be monitored to determine whether a first predetermined condition related to the free space is met. In a secondary storage, a storage block of a predetermined size may be allocated for migration, when the first predetermined condition is met. A cursor may be provided pointing to a first list entry in the primary storage. One or more list entries may be selected at the cursor. The selected list entries may be migrated to the storage block while maintaining their order in the list.

8 Claims, 4 Drawing Sheets

MIGRATING AND RETRIEVING QUEUED DATA IN BYTE-ADDRESSABLE STORAGE

BACKGROUND

The present disclosure relates to data management and, more particularly, to migrating and retrieving queued data in a coupling facility list to avoid over-populating the list.

In a coupling facility, a list structure is a dedicated portion of memory that is generally used to organize list data accessible by multiple, coupled computer systems. In some cases, a List Structure may be used as a work queue. In that case, data may be added to the queue when work needs to be performed, and removed from the queue as work is conducted.

If work is temporarily stopped, or is being performed more slowly than data is being added to the queue, then the space allotted for the queue may begin to fill up. If it fills entirely, then no more work can be added. All future attempts to increase the population of the list would have to be suppressed.

BRIEF SUMMARY

In another embodiment, a system may include a list and a migrator. The list may include a plurality of list entries in a primary storage. The migrator may be configured to monitor free space in the primary storage to determine whether a predetermined condition related to the free space is met; allocate for migration a storage block of a predetermined size in a secondary storage, when the first predetermined condition is met; provide a cursor pointing to a first list entry in the primary storage; select one or more list entries at the cursor; and migrate the selected list entries to the storage block while maintaining their order in the list.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

According to some embodiments of this disclosure, list entries may be migrated from primary storage into cheaper, secondary storage to enable a list structure of a coupling facility not to become so full as to prevent new entries from being added. This may be particularly useful when a list is used a work queue, where allowing the list to become full would prevent new work from being added to the queue.

It will be understood that, although this disclosure refers to use in a coupling facility, various embodiments are not limited to this environment. Embodiments of this disclosure may be suitable for use with various types of queues or lists, in or out of a coupling facility, to exploit a tiered hierarchy of memory.

Figure 1:
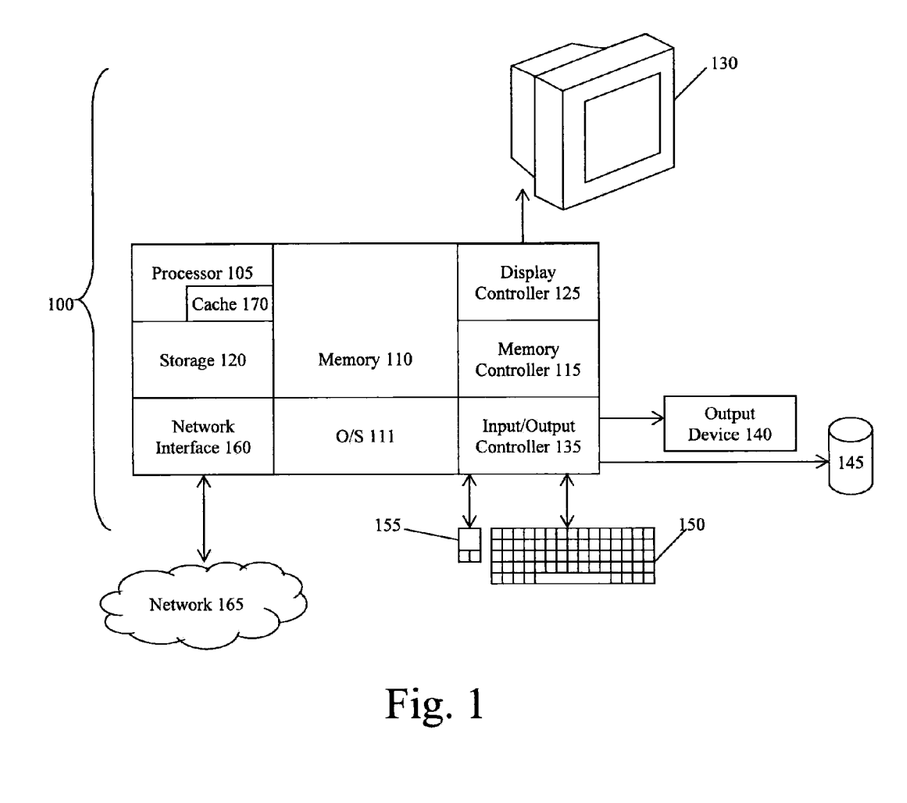
FIG. 1 illustrates a block diagram of a computing device useable with a system according to some embodiments of this disclosure.

FIG. 1 illustrates a block diagram of a computing device 100 for use in practicing teachings of this disclosure, according to some embodiments. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
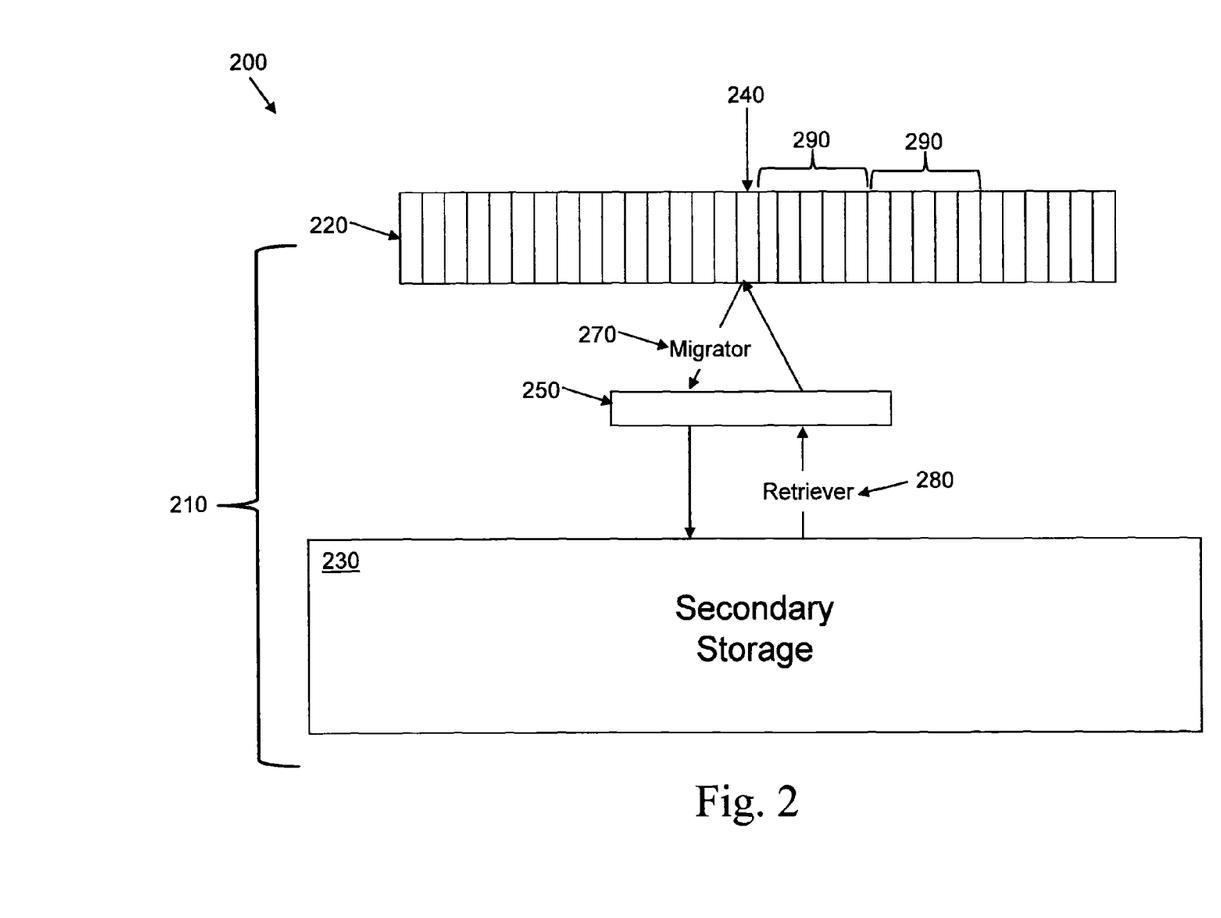
FIG. 2 illustrates a block diagram of a system according to some embodiments of this disclosure.

FIG. 2 illustrates a block diagram of a system 200 according to an exemplary embodiment of this disclosure. As shown, the system 200 operates on a list 210, which may be in the form of a list structure including list entries and may be stored in byte-addressable primary storage 220. When the list 210 approaches being too full, the system 200 may migrate data in the list 210 from primary storage 220 to secondary storage 230. Regardless of where list entries are located, in primary 220 or secondary storage 230, the system 200 may maintain the order of the list. Accordingly, if the list 210 behaves as a work queue, various processes may handle the work according to the order in which work was submitted to the list 210.

In some embodiments, the secondary storage 230 may be a cheaper, but slower, storage capable of holding a large quantity of data, while the primary storage 220 may be in lesser supply but may provide faster reading and writing. New or incoming list entries for the list 210, which entries will not be needed for a while, may be moved to the secondary storage 230. In the secondary storage 230, list entries may be bundled together into storage blocks of storage-class memory. Each storage block may have a fixed size, to enable the system 200 to easily locate and access individual storage blocks of list elements. For example, and not by way of limitation, each storage block may be one megabyte in size. It will be understood, however, that other block sizes may also be used, and the block size may be dependent on implementation and system efficiency goals.

Because of the slow nature of the secondary storage 230, it would be beneficial to have list entries that are toward the front of the list 210 located in the primary storage 220, so that work proceeds as efficiently as possible. Thus, a goal of the system 200 may be to maintain the portions of the list 210 in primary storage 220 that are soon to be processed, while using the secondary storage 230 to maintain list entries that are not ready to be processed, all the while keeping the list 210 organized so that list entries are processed in the desired order.

The system may include a migrator 270 and a retriever 280, which may each comprise hardware, software, or a combination of hardware and software. It will be understood that the migrator and the retriever need not be distinct components or processes, but may instead share the same components within the system 200. When a list 210 becomes so full that it threatens to overwhelm its primary storage 220, the migrator 270 of the system 200 may migrate list entries from the primary storage 220 to the secondary storage 230. When the list 210 returns back to a reasonable size, or when list entries in the secondary storage 230 become close to the beginning of the list 210 as the list 210 is depleted, list entries may be retrieved and returned to the primary storage 220 by the retriever 280 of the system 200.

This system 200 may migrate data when a predetermined condition is met, where that predetermined condition is based on an indication that the portion of the list 210 in primary storage 220 has reached a too-full state. The too-full state may be defined in various ways, depending on the system's implementation. For example, and not by way of limitation, the system 200 may monitor the amount of free space remaining in primary storage 220 for the list 210. When the free space falls below a predetermined level, the migration may begin. The list 210 may be used as a first-in-first-out queue, in which the newest entries are at the tail end of the list. Thus, according to some embodiments, the entries at the tail end of the list may be migrated out, thus enabling work to continue at the head of the list 210 if needed.

Figure 3:
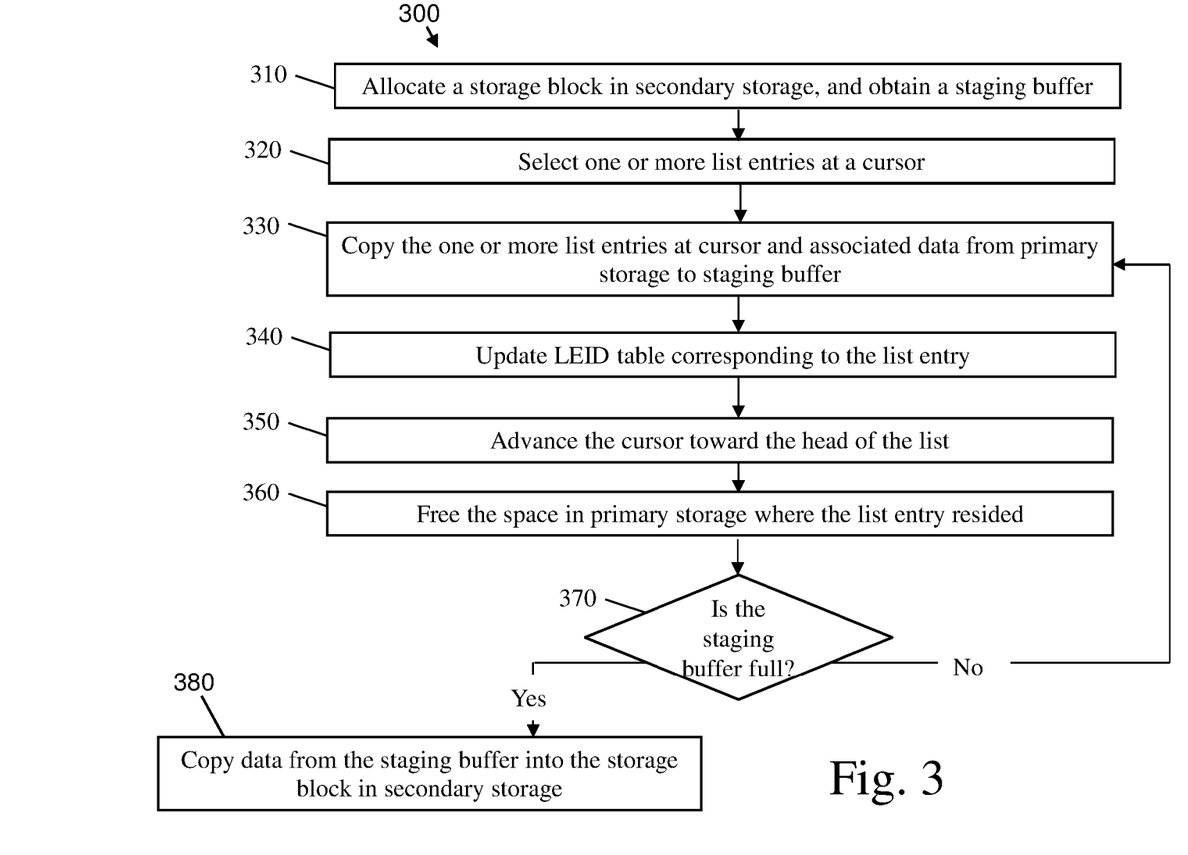
FIG. 3 illustrates a flow diagram of a method for migrating data in a list from primary storage to secondary storage, according to some embodiments of this disclosure.

FIG. 3 illustrates a flow diagram of a method 300 for migrating data in the list 210 from primary storage 220 to secondary storage 230. Before the method 300 begins, a storage class memory (SCM) cursor 240 may point to the tail of the list 210. The position of the SCM cursor 240 may indicate which one or more list entries are ready to be moved to the secondary storage 230. At block 310, a storage block of the secondary storage 230 may be allocated for holding one or more list entries that will be migrated, and a staging buffer 250 may be allocated or otherwise obtained. The staging buffer 250 maybe the same size as the storage block allocated for the migration in secondary storage 230. At block 320, one or more list entries may be selected at the SCM cursor 240. At block 330, the one or more list entries at the SCM cursor 240, along with associated data needed for processing the one or more list entries, may be copied into the staging buffer 250.

Each entry in the list 210 may be associated with a list entry identifier (LEID). An entry's LEID may be associated, such as in a table or database, with the address of the associated list entry. After a list entry at the location of the SCM cursor 240 is loaded into the staging buffer 250, at block 340, the corresponding LEID table slots corresponding to the one or more list entries may be overwritten to identify the allocated space in secondary storage 230. If, at this point, a command is received related to a list entry for which the LEID table slot has been updated (because the data is in the staging buffer 250 or in secondary storage 230), the program issuing the command may continue to get a "read in progress" error for that list entry, based on the data written in the LEID table slot. This error will continue to be obtained when attempting to access the list entry until the list entry is retrieved from secondary storage 230 and written back into primary storage 220, and the LEID table slot has been updated to indicate that. This may prevent programs from attempting to read the list entry from primary storage 220, which would lead them to accidentally acquire invalid data after the list entry has been moved or is being moved. At block 350, the SCM cursor 240 may be advanced (i.e., to the left in FIG. 2) to point to the previous list element.

At block 360, after the staging buffer 250 contains the one or more list entries at the SCM cursor 240, the storage block at the SCM cursor 240 in primary storage 220 may be freed to accept new list entries. At decision block 370, it may be determined whether the staging buffer 250 is full. If the staging buffer 250 is not yet full, at block 380, the list entry to which the SCM cursor 240 now points may be copied into the staging buffer 250, and its LEID table slot may be updated, as described above. List entries at the cursor 240 may repeatedly be copied into the staging buffer 250 until the staging buffer 250 is too full to receive more entries. If the staging buffer 250 is full, then, back at block 330, data from the staging buffer 250 may be copied into the allocated storage block of secondary storage 230.

After the staging buffer 250 has been copied into secondary storage 230, the data in the LEID table associated with the one or more newly migrated list entries may then become valid. At this point, if a program attempts to access a migrated list entry, the system 200 may retrieve the entire block of data in secondary storage 230 containing that list entry and may write the data in that storage block back to primary storage 220.

The above migration method 300 may be performed repeatedly until enough data is freed in primary storage 220 to enable the list 210 to operate as intended. For example, the system 200 may continue to migrate list data until a predetermined amount of space is made available in the primary storage 220. As the list 210 is processed in accordance with work policies, the list 210 is depleted. Eventually, list entries in secondary storage 230 may need to be returned to primary storage 220, so that those list entries may be processed as well.

A retrieval process may be performed to return list entries from secondary storage 230 to primary storage 220. The system 200 may retrieve list entries when a second predetermined condition is met, where that second predetermined condition is based on an indication that the primary storage 220 has reached a too-empty state. The too-empty state may be defined in various ways, depending on the system's implementation. For example, and not by way of limitation, the system 200 may monitor the amount of free space remaining for the list 210, and the number of list elements remaining to be processed in front of list entries that are in secondary storage 230. In an exemplary embodiment, the system 200 may attempt to retrieve each list entry in time for that list entry to be in primary storage 220 when the list entry is at the front of the list 210.

Figure 4:
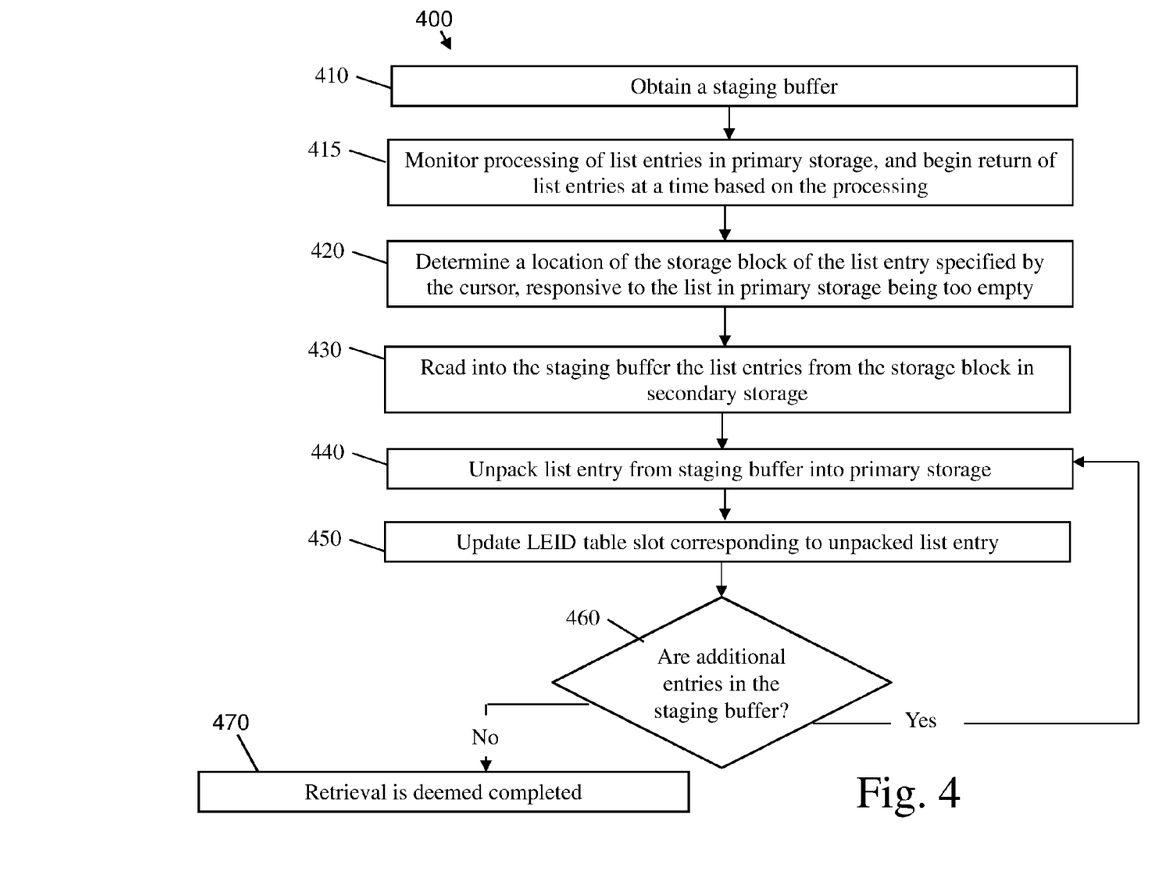
FIG. 4 illustrates a flow diagram of a method for retrieving data in the list from secondary storage, according to some embodiments of this disclosure.

FIG. 4 illustrates a flow diagram of a method 400 for retrieving list entries from secondary storage 230, according to some embodiments of this disclosure. At block 410, a staging buffer 250 may be obtained. At block 415, list entries in primary storage 220 may be monitored to determine when to begin retrieval of list entries from secondary storage 230 to primary storage 220. The time at which retrieval begins may be based on this processing of the list entries. At block 420, the LEID table slot corresponding to the current position of the SCM cursor 240 may be examined to determine the location in secondary storage 230 of the list entry to be retrieved and placed at the position of the SCM cursor 240. At block 430, the storage block in secondary storage 230, at the location indicated in the LEID table slot, may be read into the staging buffer 250.

At this point, the location, as specified in the LEID table, of the list entries in the staging buffer 250 is no longer valid. Thus, as described above, a program attempting to access these list entries may receive a "read in progress" error until the list entries are returned to primary storage 220 and the corresponding LEID table slots are updated accordingly.

At block 440, a list entry in the staging buffer 250 may be unpacked into the primary storage 220. At block 450, the LEID table slot may be updated to indicate the address of the unpacked list entry in primary storage 220. At decision block 460, it may be determined whether additional list entries are contained in the staging buffer 250. If additional list entries are in the staging buffer 250, then, back at block 440, those too may be unpacked and their corresponding LEID table slots may be updated. If no more list entries remain to be unpacked, the retrieval may be deemed completed, at block 470. This method 400 may be repeated until a sufficient amount of data has been read back into primary storage 220 to allow work to proceed by processing the list entries.

In some instances, it may not be possible to unpack the entire staging buffer 250 into primary storage 220. This can occur if there is too little free space in primary storage 220 to hold all the list entries being retrieved from secondary storage 230. If this occurs, the remaining list entries may be returned to the storage block that was allocated for them in secondary storage 230.

When migration occurs on the list 210, the SCM cursor 240 may gradually move forward (i.e., to the left in FIG. 2). When retrieval occurs, retrieved list entries may be placed behind (i.e., to the right in FIG. 2) of the SCM cursor 240, and the cursor may then be moved backward in the list 210. When new list entries are added, they too may be positioned behind the SCM cursor 240, even though entries closer to the head of the list are already in secondary storage 230. When processes dispatch the work items indicated by the various list entries, they will generally process the list entries in the order received. Thus, these newest entries behind the SCM cursor 240 will be processed last and therefore need not be kept in primary storage 220, where they were inserted.

The system 200 may provide a way to maintain the order of the list entries, while at the same time migrating newly received list entries when possible. To this end, one or more priority queues 290 may be used. For example, and not by way of limitation, ten priority queues 290 may be used.

The list entries need not be actively moved into the priority queues 290. Rather, each list entry behind the SCM cursor 240 may be deemed to be positioned in a priority queue 290. The priority queues 290 may represent list entries that have priority with respect to being migrated to secondary storage 230. In the case of ten priority queues 290, each priority queue 290 may be assigned a number from zero to nine where higher numbered queues are higher priority for migration, and are toward the tail of the list order for work processing. The priority queue 290 that a list entry is deemed to occupy may be determined by the high-order byte in a sixteen-byte key. When it has been determined that migration is necessary again, because the list 210 is becoming too full, the priority queues may be examined, starting with priority nine and scanning forward, to determine whether any of the priority queues has enough entries to fill a storage block in the secondary storage 230. If no such priority queue can be found, then older entries in front of the SCM cursor 240 may be examined to determine if there exist enough of them to fill a storage block in secondary storage 230. If so, then these older entries may be moved instead, although they are closer to being processed than list entries in the priority queues 290.

When programs that dispatch the work items on the list 210 deplete the list 210 by processing the list entries, the SCM cursor 240 may attempt to outrun these programs. For the cursor 240 to have a reasonable chance of staying ahead of the processes that dequeue entries from the head of the list 210, the system 200 may attempt to keep list entries that are in the same neighborhood, with respect to the actual list order, together. Thus, the system 200 may perform migration of an entire priority queue 290 or of a group of list entries ahead of the priority queues 290. Further, the migrated blocks of data may be retrieved together whenever possible. As a result, it may be possible to keep track of the actual order of the list 210, while retrieving data before it is needed for work processing.

Entries from different priority queues (or from different lists 210 if multiple lists 210 are being migrated) may be grouped together into a single storage block in secondary storage 230 only if the portion of the list in primary storage 220 is dangerously close to being declared full. The portion of the list in primary storage 220 being full is a worst case scenario, as it prevents new work from being added as list entries. Thus, migration of list entries that are not in the same neighborhood, with respect to list order, may be preferable to allowing the primary storage 220 to fill up.

Although not ideal, a situation may occur in which work is being processed quickly from the front of the list, and retrieval is not able to keep up. In that case, programs may attempt to read and dispatch list entries that are stored in secondary storage 230. Although this may slow the programs down, since secondary storage 230 may be slower to access than primary storage 220, the system 200 may allow of this situation. When a list entry is needed for processing, that list entry along with the remainder of its storage block in secondary storage 230 may be retrieved into primary storage 220, where the list entry may be processed immediately.

Allowance may be made for the possibility that list entries that have been migrated out to secondary storage 230 may be referenced by various programs even when these list entries are not at the head of the list 210. Such a reference may result in retrieving the referenced list entries and returning them to primary storage 220. In that case, the retrieved list entries may be added to the priority queues 290. If a retrieved list entry happens to be the entry that is ordered behind the list entry at the SCM cursor 240, the retrieved list entry may be placed immediately behind the SCM cursor 240 and the cursor 240 may be modified to point at the newly retrieved list entry, instead of the list entry being added to a priority queue 290.

In some embodiments, the system 200 may manage multiple lists 210 within primary storage 220. In that case, migration operations may be performed on the list 210 with the greatest number of list entries in primary storage, and retrieval may be performed on the list 210 with the fewest number of entries in primary storage 220. Alternatively, in some embodiments, retrieval may be performed on the list 210 from which list entries are being dequeued the fastest, or the list 210 predicted to be the first require work to be processed from list entries that are currently in secondary storage 230 based on the rate at which work is being processed. It will be understood that various alternative conditions may be used to determine priorities for which list's entries are migrated or retrieved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
a list comprising a plurality of list entries of the list, wherein the plurality of list entries of the list reside in a primary storage, wherein the list is a work queue, and wherein each of the plurality of list entries of the list represents an item of work; and
one or more computer processors configured to:
monitor free space in the primary storage to determine whether a predetermined condition related to the free space is met;
allocate for migration a storage block of a predetermined size in a secondary storage, responsive to the predetermined condition being met;
position a cursor at a cursor location, the cursor pointing to a first list entry in the plurality of list entries of the list in primary storage, wherein the positioning the cursor at the cursor location comprises identifying that one or more unprocessed list entries at the cursor location are not ready for processing and that the one or more unprocessed list entries have a size that would fill the storage block of the predetermined size in the secondary storage;
select the one or more unprocessed list entries at the cursor, the one or more unprocessed list entries being selected from the plurality of list entries of the list, ordered in the primary storage;
migrate the one or more unprocessed list entries which were selected from the plurality of list entries of the list to the storage block while maintaining their order in the list, wherein the migrating leaves one or more remaining list entries of the plurality of list entries of the list ordered in the primary storage;
wherein, as a result of the migration, the one or more remaining list entries of the list are stored and ordered in the primary storage while the one or more unprocessed list entries of the list are stored and ordered in the secondary storage, such that the one or more unprocessed list entries in the secondary storage are ordered relative to the one or more remaining entries in the primary storage such that the one or more remaining list entries and the one or more unprocessed list entries together form at least an ordered portion of the list;
determine that the list has reached a too-empty state in the primary storage;
determine a location of the one or more unprocessed list entries in the secondary storage corresponding to a current position of the cursor, responsive to determining that the list has reached the too-empty state in the primary storage;
return the one or more unprocessed list entries to the current position of the cursor in the primary storage while maintaining their order in the list, responsive to determining the location of the one or more unprocessed list entries in the secondary storage; and processing, from the primary storage, the items of work represented by the one or more unprocessed list entries returned to the primary storage.

2. The system of claim 1, the one or more computer processors being further configured to move the cursor toward the head of the list in the primary storage after migrating the one or more unprocessed list entries.

3. The system of claim 1, the one or more computer processors being further configured to return the one or more unprocessed list entries to the current position of the cursor by copying from secondary storage the storage block of the predetermined size.

4. The system of claim 1, the one or more computer processors being further configured to monitor processing of the one or more remaining list entries in the primary storage, wherein the one or more unprocessed list entries are returned to the primary storage at a selected time that is based at least in part on the processing of the one or more remaining list entries in the primary storage.

5. The system of claim 1, the one or more computer processors being further configured to receive additional list entries for the list in primary storage, and to assign the additional list entries to one or more priority queues for ordering the additional list entries in the list.

6. The system of claim 1, wherein after the migration, a head of the list remains in the primary storage to enable work processing to proceed at a list entry at the head of the list.

7. The system of claim 1, the one or more computer processors further configured to maintain a list entry identifier table comprising, for each of the plurality of list entries of the list, a list entry identifier and a location.

8. The system of claim 7, the one or more computer processors further configured to update the list entry identifier for each of the one or more unprocessed list entries migrated to the secondary storage, to indicate that the one or more unprocessed list entries are now located in the secondary storage.

* * * * *